US011195318B2

(12) United States Patent
Suma et al.

(10) Patent No.: US 11,195,318 B2
(45) Date of Patent: Dec. 7, 2021

(54) RAPID AVATAR CAPTURE AND SIMULATION USING COMMODITY DEPTH SENSORS

(71) Applicant: UNIVERSITY OF SOUTHERN CALIFORNIA, Los Angeles, CA (US)

(72) Inventors: Evan Suma, Los Angeles, CA (US); Gerard Medioni, Los Angeles, CA (US); Mark Bolas, Los Angeles, CA (US); Ari Y. Shapiro, Sherman Oaks, CA (US); Wei-Wen Feng, Marina del Rey, CA (US); Ruizhe Wang, Pasadena, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 14/694,670

(22) Filed: Apr. 23, 2015

(65) Prior Publication Data

US 2015/0356767 A1 Dec. 10, 2015

Related U.S. Application Data

(60) Provisional application No. 61/983,300, filed on Apr. 23, 2014.

(51) Int. Cl.
*G06T 15/00* (2011.01)
(52) U.S. Cl.
CPC ........ *G06T 15/005* (2013.01); *G06T 2215/16* (2013.01)
(58) Field of Classification Search
USPC ........................................ 345/419, 421, 422
See application file for complete search history.

(56) References Cited

U.S. PATENT DOCUMENTS

| 8,692,830 | B2 | 4/2014 | Nelson et al. |
| 8,797,328 | B2* | 8/2014 | Corazza ................. G06T 13/40 345/420 |
| 2008/0158224 | A1 | 7/2008 | Wong et al. |
| 2009/0322763 | A1 | 12/2009 | Bang et al. |
| 2011/0148864 | A1 | 6/2011 | Lee et al. |
| 2011/0228976 | A1* | 9/2011 | Fitzgibbon ......... G06K 9/00335 382/103 |
| 2012/0086783 | A1 | 4/2012 | Sareen |

(Continued)

FOREIGN PATENT DOCUMENTS

WO    WO2012012753 A1    1/2012

OTHER PUBLICATIONS

Zollhofer et al. "Automatic Reconstruction of Personalized Avatars from 3D Face Scans", Published 2011.*

(Continued)

*Primary Examiner* — Weiming He
(74) *Attorney, Agent, or Firm* — Snell & Wilmer LLP

(57) ABSTRACT

A non-transitory, tangible, computer-readable storage medium may contain a program of instructions that cause a computer system running the program of instructions to automatically generate a 3D avatar of a living being, including automatically: causing one or more sensors to generate 3D data indicative of the three dimensional shape and appearance of at least a portion of the living being; and generating a virtual character based on the 3D data that can be animated and controlled.

22 Claims, 10 Drawing Sheets

(56) References Cited

U.S. PATENT DOCUMENTS

| | | | | |
|---|---|---|---|---|
| 2013/0097194 | A1* | 4/2013 | Braga | G06F 17/30256 707/758 |
| 2013/0235045 | A1 | 9/2013 | Corazza et al. | |
| 2013/0278501 | A1* | 10/2013 | Bulzacki | G06F 3/017 345/157 |
| 2014/0016837 | A1 | 1/2014 | Nechyba et al. | |
| 2014/0313192 | A1* | 10/2014 | Corazza | G06T 17/20 345/420 |
| 2015/0178988 | A1* | 6/2015 | Montserrat Mora | G06T 13/40 345/420 |
| 2015/0262405 | A1* | 9/2015 | Black | G06T 7/0022 345/420 |
| 2016/0088284 | A1* | 3/2016 | Sareen | G06N 3/006 348/47 |
| 2016/0247017 | A1* | 8/2016 | Sareen | G06T 19/00 |

OTHER PUBLICATIONS

Cui et al. "KinectAvatar: Fully Automatic Body Capture Using a Single Kinect", Publish 2013.*
Meyer et al. "Real-Time 3D face Modeling with a Commodity Depth Camera", Published 2013.*
Lie et al., Contour-based image registration with local deformations, Opt. Eng. 42(5) 1405-1416 (May 2003) (Year: 2003).*
Chuang et al., Estimating the Laplace-Beltrami Operator by Restricting 3D Functions, Eurographics Symposium on Geometry Processing 2009, vol. 28, No. 5, 2009, (Year: 2009).*
Automatic Rigging and Animation of 3D Characters, ACM SIGGRAPH conference proceedings, vol. 26, No. 3, Jul. 2007 (Year: 2007).*
US International Searching Authority. 2016. International Search Report and Written Opinion of the International Searching Authority for PCT Application PCT/US2015/027346, dated Jan. 4, 2016. (PCT application corresponds to instant US application.).
Anguelov, D. et al. 2005. "Scape: Shape completion and animation of people," In ACM SIGGRAPH 2005 Papers, SIGGRAPH '05, pp. 408-416, New York, NY, USA.
Baran, I. et al. 2007. "Automatic rigging and animation of 3d characters," In ACM Trans. Graph., 26(3), Jul. 2007.
Bharaj, G. et al. 2011. "Automatically rigging multi-component characters," In Comp. Graph. Forum (Proc. Eurographics 2012), 30(2), 2011.
Buss, S,R. 2004. "Introduction to inverse kinematics with Jacobian transpose, pseudoinverse and damped least squares methods," Technical report, IEEE Journal of Robotics and Automation, 2004.
Chen, Y. et al. 1992. "Object modelling by registration of multiple range images," Image and vision computing, 10(3):145-155, 1992.
Chuang, M. et al. 2009. "Estimating the laplace-beltrami operator by restricting 3d functions," In Computer Graphics Forum, vol. 28, pp. 1475-1484. Wiley Online Library.
Cui, Y. et al. 2013. "Kinectavatar: fully automatic body capture using a single kinect," In Computer Vision-ACCV 2012 Workshops, pp. 133-147, Springer, 2013.
Dionne, O. et al. 2013. "Geodesic voxel binding for production character meshes," In Proceedings of the 12th ACM SIGGRAPH/ Eurographics Symposium on Computer Animation, SCA '13, pp. 173-180, New York, NY, USA, 2013.
Feng, A. et al. 2013. "Fast, automatic character animation pipelines," Computer Animation and Virtual Worlds, 2013.
Fischler, M.A. et al. 1981. "Random sample consensus: a paradigm for model fitting with applications to image analysis and automated cartography," In Communications of the ACM, 24(6):381-395.
Jain, A. et al. 2010. "Moviereshape: Tracking and reshaping of humans in videos," In ACM Trans. Graph. (Proc. SIGGRAPH Asia 2010), 29(5), 2010.
Kazhdan, M. et al. 2006. "Poisson surface reconstruction," In Proceedings of the fourth Eurographics symposium on Geometry processing 2006.
Li, H. et al. 2013. "3d self-portraits," ACM Transactions on Graphics (Proceedings SIGGRAPH Asia 2013), 32(6), Nov. 2013.
McDonnell, R. et al. 2008. "Clone attack! perception of crowd variety," In ACM Trans. Graph., 27(3):26:1-26:8, Aug. 2008.
McDonnell, R. et al. 2009. "Eye-catching crowds: Saliency based selective variation," In ACM Trans. Graph., 28(3):55:1-55:10, Jul. 2009.
Newcombe, R.A. et al. 2011. "Kinectfusion: Real-time dense surface mapping and tracking," In Mixed and augmented reality (ISMAR), 2011 10th IEEE international symposium on, pp. 127-136. IEEE, 2011.
Rusinkiewicz, S. et al. 2001."Efficient variants of the ICP algorithm," In 3-D Digital Imaging and Modeling, 2001. Proceedings Third International Conference on, pp. 145-152.
Sumner, R.W. et al. 2007. "Embedded deformation for shape manipulation," In ACM Transactions on Graphics (TOG), vol. 26, p. 80. ACM.
Tong, J. et al. 2012. "Scanning 3d Full Human Bodies Using Kinects," Visualization and Computer Graphics, IEEE Transactions on, 18(4): 643-650.
Vlasic, D. et al. 2009. "Dynamic shape capture using multi-view photometric stereo," In ACM Transactions on Graphics, 2009.
Wang, R. et al. 2012. "Accurate full body scanning from a single fixed 3d camera," In 3D Imaging, Modeling, Processing, Visualization and Transmission (3DIMPVT), 2012 Second International Conference on, pp. 432-439, IEEE.
Weiss, A. et al. 2011. "Home 3d body scans from noisy image and range data," In Computer Vision (ICCV), 2011 EEE International Conference on, pp. 1951-1958. IEEE, 2011.
Wu, C. et al. 2013. "On-set performance capture of multiple actors with a stereo camera," In ACM Transactions on Graphics (Proceedings of SIGGRAPH Asia 2013), vol. 32, Nov. 2013.
Zeng, M. et al. 2013. "Templateless quasi-rigid shape modeling with implicit loop-closure," In Computer Vision and Pattern Recognition (CVPR), 2013 IEEE Conference on, pp. 145-152 IEEE, 2013.
Mixamo auto-rigger, 2013. http://www.mixamo.eom/c/auto-rigger. (Snapshot of mixamo.com/c/auto-rigger dated Nov. 22, 2013, downloaded from Internet Archive Wayback Machine.).
Gizmodo. 2014. http://gizmodo.com/nikon-just-put me-in-a-video-game-and-it was totally in-1497441443. (Snapshot of http://gizmodo.com/nikon-just-put-me-in-a-video-game-and-it-was-totally-in-1497441443 taken on May 19, 2014, downloaded from Internet Archive Wayback Machine.).
Wang, Ruizhe et al. 2014. "3d modeling from wide baseline range scans using contour coherence," (CVPR), 2014 IEEE Conference on, pp. 1-8, IEEE, 2014.

* cited by examiner

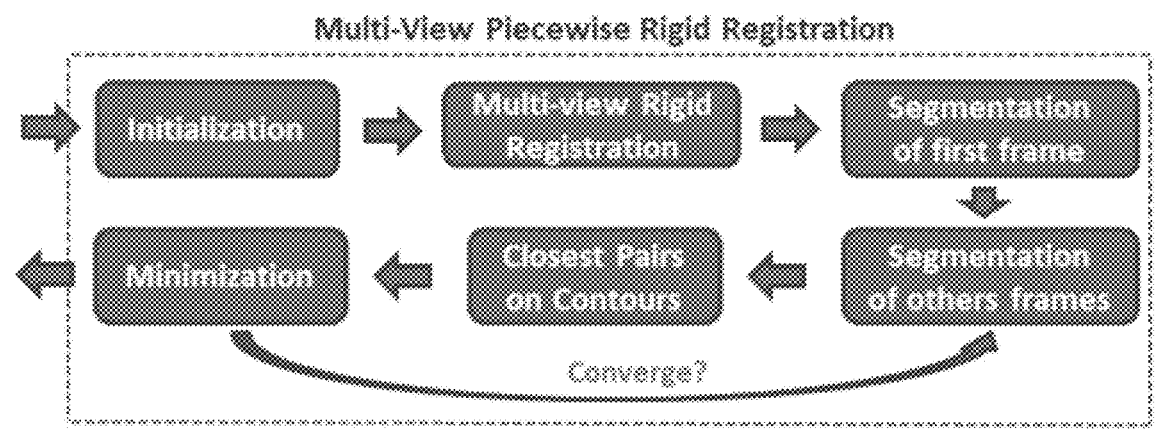
FIG. 7
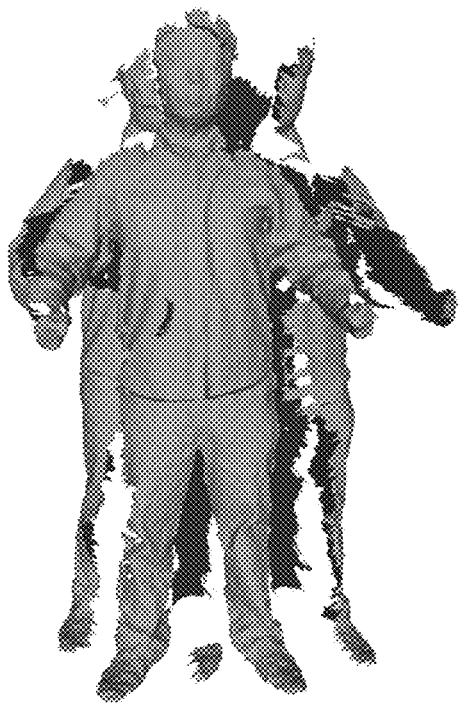 
FIG. 8A      FIG. 8B

RAPID AVATAR CAPTURE AND SIMULATION USING COMMODITY DEPTH SENSORS

CROSS-REFERENCE TO RELATED APPLICATION

This application is based upon and claims priority to U.S. provisional patent application 61/983,300, entitled "RAPID AVATAR CAPTURE AND SIMULATION USING COMMODITY DEPTH SENSORS," filed Apr. 23, 2014. The entire content of this application is incorporated herein by reference.

STATEMENT REGARDING FEDERALLY SPONSORED RESEARCH

This invention was made with government support under Contract No. W911NF-04-D-0005, awarded by the Army of Naval Research Office. The government has certain rights in the invention.

BACKGROUND

Technical Field

This disclosure relates to avatar capture and simulation.

Description of Related Art

Recent advances in low-cost scanning have enabled the capture and modeling of real-world objects into a virtual environment in 3D. For example, a table, a room, or work of art can be quickly scanned, modeled, and displayed within a virtual world with a handheld, consumer scanner.

There can be great value in the ability to quickly and inexpensively capture real-world objects and create their 3D counterparts. While numerous generic 3D models are available for low- or no-cost use in 3D environments and virtual worlds, such acquired 3D models may not match the real object to a reasonable extent, without individually modeling the object.

In addition, the ability to capture specific objects that vary from the generic counterparts can be valuable for recognition, interaction, and comprehension within a virtual world. For example, a real table could have a noticeable scratch, design, imperfection or size that differs greatly from a stock 3D model of a table. These individual markers can serve as landmarks for people interacting with the virtual scene.

The impact of recognizing living objects in a virtual environment can be very powerful, such as the effect of seeing a relative, partner or even yourself in a simulation. However, living objects present simulation challenges due to their dynamic nature. Organic creatures, such as plants, can be difficult to scan due to their size and shape, which may require high levels of details and stable scanning environments. Similarly, other living objects, such as people or animals, can be scanned, but can require much more complex models to model motion and behavior.

In addition, the particular state of the living object can vary tremendously; an animal may grow, a plant can blossom flowers, and a person can wear different clothes, inhale or exhale, and gain or lose weight. Thus, capturing a moment in time of a living object may not be sufficient for its representation in dynamic environments, where the 3D representation of that living object is expected to breath, move, grow, and respond to interaction in non-trivial ways.

3D Shape Reconstruction 3D shape reconstruction has been extensively explored, among which the 3D shape reconstruction of human subjects has been of specific interest to computer vision and computer graphics, with its potential applications in recognition, animation and apparel design. With the availability of low-cost 3D cameras (e.g., Kinect and Primesense), many inexpensive solutions for 3D human shape acquisition have been proposed.

The work by Jing Tong, Jin Zhou, Ligang Liu, Zhigeng Pan, and Hao Yan, "*Scanning 3d Full Human Bodies Using Kinects*," Visualization and Computer Graphics, IEEE Transactions on, 18(4):643-650, 2012, employs three Kinect devices and a turntable. As the turntable rotates, multiple shots are taken with the three precalibrated Kinect sensors to cover the entire body. All frames are registered in a pairwise non-rigid manner using the Embedded Deformation Model, Robert W Sumner, Johannes Schmid, and Mark Pauly "Embedded deformation for shape manipulation," In ACM Transactions on Graphics (TOG), volume 26, page 80. ACM, 2007, and loop-closure is explicitly addressed at the final stage.

The work done in Ming Zeng, Jiaxiang Zheng, Xuan Cheng, and Xinguo Liu, "*Templateless quasi-rigid shape modeling with implicit loop-closure*," In Computer Vision and Pattern Recognition (CVPR), 2013 IEEE Conference on, pages 145-152. IEEE, 2013, utilizes two Kinect sensors in front of the self-turning subject. The subject stops at several key poses and the captured frame is used to update the online model. Again the dynamic nature of the turning subject is considered under the same non-rigid registration framework Robert W Sumner, Johannes Schmid, and Mark Pauly "*Embedded deformation for shape manipulation*," In ACM Transactions on Graphics (TOG), volume 26, page 80. ACM, 2007, and the loop is implicitly closed.

More recently, solutions which utilize only a single 3D sensor have been proposed, and this allows for home-based scanning and applications. The work in Ruizhe Wang, Jongmoo Choi, and Gérard Medioni, "*Accurate full body scanning from a single fixed 3d camera*," In 3D Imaging, Modeling, Processing, Visualization and Transmission (3DIMPVT), 2012 Second International Conference on, pages 432-439, IEEE, 2012, asks the subject to turn in front of a fixed 3D sensor and 4 key poses are uniformly sampled to perform shape reconstruction. The 4 key poses are registered in a top-bottom-top fashion, assuming an articulated tree structure of human body. Their reconstructed model, however, may suffer from a low-resolution issue at a distance.

To overcome the resolution issue, KinectAvatar Yan Cui, Will Chang, Tobias Nöll, and Didier Stricker, "*Kinectavatar: fully automatic body capture using a single kinect*," In Computer Vision-ACCV 2012 Workshops, pages 133-147, Springer, 2013, considers color constraints among consecutive frames for super-resolution. They register all super-resolution frames under a probabilistic framework.

More recently, the work in Hao Li, Etienne Vouga, Anton Gudym, Linjie Luo, Jonathan T. Barron, and Gleb Gusev, "*3d self-portraits*," ACM Transactions on Graphics (Proceedings SIGGRAPH Asia 2013), 32(6), November 2013, asks the subject to come closer and obtain a super-resolution scan at each of 8 key poses. The 8 key poses are then aligned in a multi-view non-rigid manner to generate the final model.

They may merge all range scans using the Iterative Closest Point (ICP) algorithm, Yang Chen and Gérard Medioni, "*Object modelling by registration of multiple*

*range images*," Image and vision computing, 10(3):145-155, 1992, along with the Poisson Surface Reconstruction algorithm, Michael Kazhdan, Matthew Bolitho, and Hugues Hoppe, "Poisson surface reconstruction," In Proceedings of the fourth Eurographics symposium on Geometry processing 2006.

These works may capture the static geometry of human subjects. Additional efforts may be necessary to convert the static geometry into an animated virtual character.

Research works Chenglei Wu, Carsten Stoll, Levi Valgaerts, and Christian Theobalt, "*On-set performance capture of multiple actors with a stereo camera*," In ACM Transactions on Graphics (Proceedings of SIGGRAPH Asia 2013), volume 32, November 2013 and Daniel Vlasic, Pieter Peers, Ilya Baran, Paul Debevec, Jovan Popovic, Szymon Rusinkiewicz, and Wojciech Matusik, "Dynamic shape capture using multi-view photometric stereo," In In ACM Transactions on Graphics, 2009, focus on capturing the dynamic shapes of an actor's full body performance. The capturing sessions may require a dedicated setup with multiple cameras and may be more expensive than capturing only the static geometry. The resulting dynamic geometries can be played back to produce the animations of the scanned actor.

The work in Dragomir Anguelov, Praveen Srinivasan, Daphne Koller, Sebastian Thrun, Jim Rodgers, and James Davis, "*Scape: Shape completion and animation of people*," In ACM SIGGRAPH 2005 Papers, SIGGRAPH '05, pages 408-416, New York, N.Y., USA, 2005. ACM, combines dynamic shapes from multiple actors to form a shape space. The novel body deformations are driven by motion capture markers and can be synthesized based on an actor's new performance.

Other research has created a database of people that show the diversity of shape, size and posture in a small population of shape, size and posture, Dragomir Anguelov, Praveen Srinivasan, Daphne Koller, Sebastian Thrun, Jim Rodgers, and James Davis, "*Scape: shape completion and animation of people*," In ACM Transactions on Graphics (TOG), volume 24, pages 408-416. ACM, 2005. The data set may have to be employed for human body modeling by fitting the model to input range scans of subject of interest. Alexander Weiss, David Hirshberg, and Michael J Black, "*Home 3d body scans from noisy image and range data*," In Computer Vision (ICCV), 2011 IEEE International Conference on, pages 1951-1958. IEEE, 2011. This data set has also been used to manipulate a scanned human model by modifying the models proportions according to the data. Arjun Jain, Thorsten Thormählen, Hans-Peter Seidel, and Christian Theobalt, "*Moviereshape: Tracking and reshaping of humans in videos*," ACM Trans. Graph. (Proc. SIGGRAPH Asia 2010), 29(5), 2010.

Automatic Rigging and Retargeting

While it may be relatively easy to obtain static 3D character models, either from the internet or through 3D scanning, it may require much more efforts to create an animated virtual character.

A 3D model may need to be rigged with a skeleton hierarchy and appropriate skinning weights. Traditionally, this process may need to be done manually and may be time consuming, even for an experienced animator.

An automatic skinning method is proposed in Ilya Baran and Jovan Popović, "*Automatic rigging and animation of 3d characters*," ACM Trans. Graph., 26(3), July 2007, to reduce the manual efforts of rigging a 3D model. The method may produce reasonable results, but may require a connected and watertight mesh to work. The method proposed by Gaurav Bharaj, Thorsten Thormählen, Hans-Peter Seidel, and Christian Theobalt, "*Automatically rigging multi-component characters*," Comp. Graph. Forum (Proc. Eurographics 2012), 30(2), 2011, may complement the previous work by automatically skinning a multi-component mesh. It may work by detecting the boundaries between disconnected components to find potential joints. Thus, the method may be suitable for rigging the mechanical characters that usually consist of many components.

Other rigging algorithms can include manual annotation to identify important structures, such as wrists, knees and neck. Mixamo auto-rigger, 2013. http://www.mixamo.com/c/auto-rigger.

Recent work has shown the capability of capturing a human figure and placing that character into a simulation using 48 cameras with processing time on the order of two hours. xxarray demo at ces, 2014. http://gizmodo.com/nikon-just-put-me-in-a-video-game-and-it-was-totally-in-1497441443.

SUMMARY

A non-transitory, tangible, computer-readable storage medium may contain a program of instructions that cause a computer system running the program of instructions to automatically generate a 3D avatar of a living being, including automatically: causing one or more sensors to generate 3D data indicative of the three dimensional shape and appearance of at least a portion of the living being; and generating a virtual character based on the 3D data that can be animated and controlled.

The program of instructions may cause the computer system running the program of instructions to map each of multiple behavior commands to one or more of a library of virtual character movement instructions.

The program of instructions may cause the computer system running the program of instructions to controllably cause the one or more sensors to capture a movement of the living being and transform that into virtual character movement instructions.

The program of instructions may cause the computer system running the program of instructions to map each of multiple behavior commands to one or more of a library of virtual character movement instructions that mimic an individual movement style of the living being.

The program of instructions may cause the computer system running the program of instructions to: direct the living being to pose in four different positions; and cause the one or more sensors to capture 3D data of the living being in each of the four different positions.

The program of instructions may cause the computer system running the program of instructions to direct the living being to rotate a total of about 360 degrees and causes the 3D data to be captured at about 90 degree increments during this rotation.

The program of instructions may cause the computer system running the program of instructions to perform all of the steps recited in the first paragraph of this summary within no more than twenty, ten, or five minutes.

The one or more sensors may include only a single depth sensing camera and only a single color camera.

The program of instructions may cause the computer system running the program of instructions to cause the one or more sensors to generate 3D data indicative of the three dimensional shape and appearance of at least a portion of the living being based on multiple sets of 3D data of the living being, each set taken from a different physical distance from the living being.

The program of instructions may cause the computer system running the program of instructions to cause the 3D data set taken at a closer distance to replace a portion of the 3D data set taken at a further distance.

The living being may have a face or hand and the portion that is replaced may be of the face or the hand.

The program of instructions may cause the computer system running the program of instructions to cause the one or more sensors to generate 3D data indicative of the three dimensional shape and appearance of a portion of the living being multiple times, each time while the living being is exhibiting a behavior that cause the portion to look different than when the living being is exhibiting a different behavior.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 7 illustrates an example of a general pipeline of a registration method.

FIG. 8A illustrates an example of 4 super-resolution range scans after initialization. FIG. 8B illustrates an example of 4 super-resolution range scans after multi-view rigid registration, with boxes indicating unresolved small articulations under a rigid assumption.

FIG. 9A illustrates an example of original mesh and its skeleton. FIG. 9B illustrates an example of voxel representation of original mesh and its corresponding skeleton.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Background

Figure 1:
FIG. 1 illustrates examples of various human behaviors, such as jumping and running, that may be simulated in real time using 3D models with the help of auto-rigging and animation retargeting.

This disclosure demonstrates a process for capturing human subjects and generating digital characters from those models using commodity scanning hardware. The process may be capable of capturing a human subject using still four poses, constructing a 3D model, then registering it and controlling it within an animation system within minutes. The digital representation that the process is able to construct may be suitable for use in simulations, games and other applications that use virtual characters. The technique may be able to model many dynamic aspects of human behavior (see FIG. 1).

Figure 4:
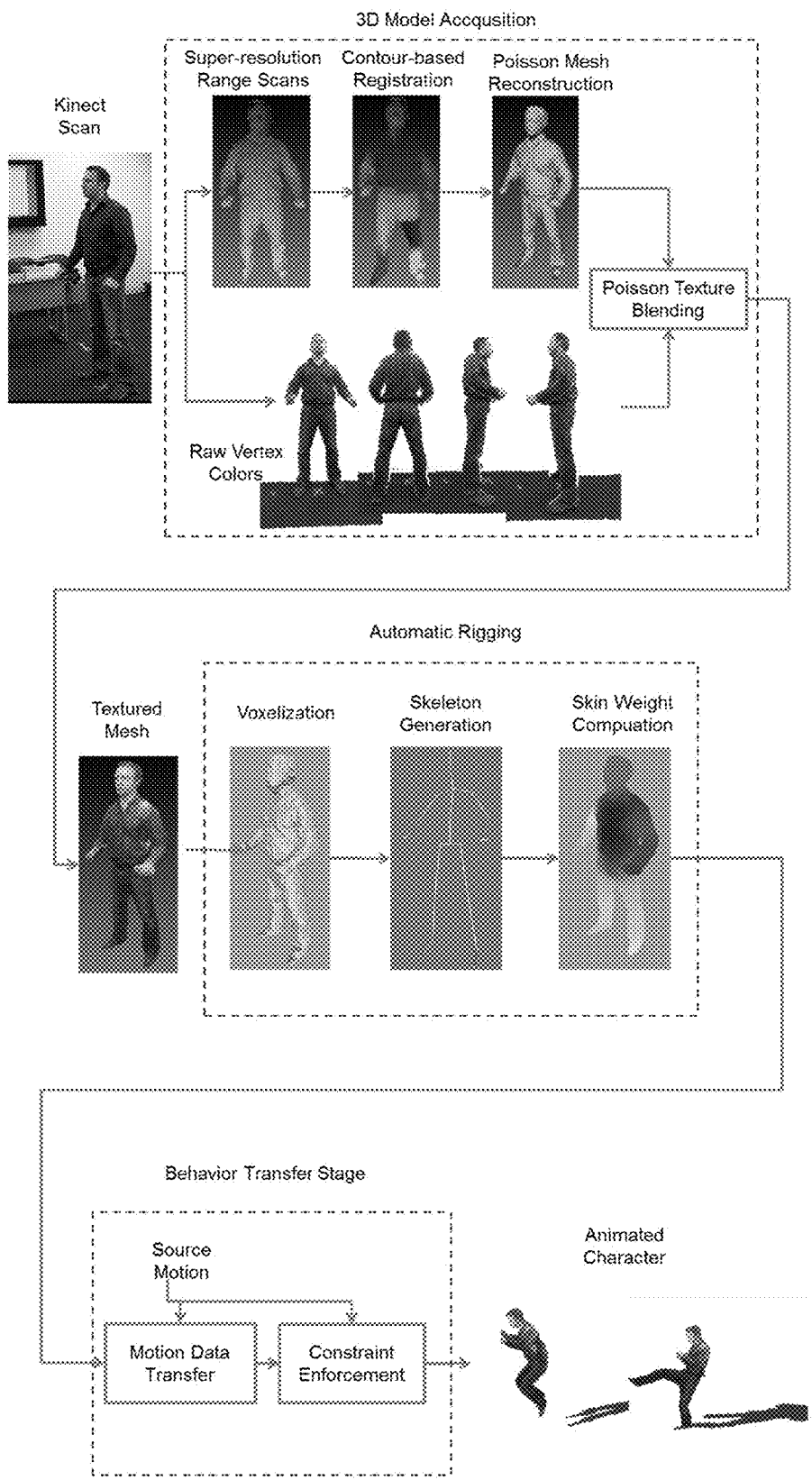
FIG. 4 illustrates an example of an overall work flow process of rapid avatar system, including automatic rigging, skinning, behavior transfer, and control.

FIG. 4 illustrates an example of an overall work flow process of rapid avatar system, including automatic rigging, skinning, behavior transfer, and control. As shown in FIG. 4, this process may almost be almost completely automated. It may also be rapid and a low-cost end-to-end system for capture, modeling and simulation of a human figure in a virtual environment that requires no expert intervention.

3D Shape Reconstruction

The process may ask the subject to get closer and employ a novel super-resolution scheme. The process may use the KinectFusion algorithm, Richard A Newcombe, Andrew J Davison, Shahram Izadi, Pushmeet Kohli, Otmar Hilliges, Jamie Shotton, David Molyneaux, Steve Hodges, David Kim, and Andrew Fitzgibbon, "*Kinectfusion: Real-time dense surface mapping and tracking*," In Mixed and augmented reality (ISMAR), 2011 10th IEEE international symposium on, pages 127-136. IEEE, 2011, which may incrementally update an online volumetric model.

Automatic Rigging and Retargeting

The method may use a single commodity camera and scanner and the processing time may takes only a few minutes. While this may introduce a tradeoff in visual quality, the minimal technical infrastructure that may be require may make the approach substantially more accessible to a widespread audience. In addition, the method may not require any expert intervention during the rigging and animation phases.

What will now be described in more detail is a convenient and fast way to acquire accurate static 3D human models of different shapes by the use of a single commodity hardware, e.g., Kinect. The subject may turn in front of the Kinect sensor in a natural motion, while staying static at 4 key poses, namely front, back and two profiles, for approximately 10 seconds each.

For each key pose, a super-resolution range scan may be generated as the Kinect device, controlled by a built-in motor, moves up and down, as described in more detail below. The 4 super-resolution range scans may then be aligned in a multi-view piecewise rigid manner, assuming small articulations between them.

Traditional registration algorithms (e.g., Iterative Closest Point, Yang Chen and Gérard Medioni, "Object modelling by registration of multiple range images," Image and vision computing, 10(3):145-155, 1992, may be based on the shape coherence and may fail in this scenario because the overlap between consecutive frames is very small. Instead, the method described herein may employ contour coherence, as explained in more detail below, and may develop a contour-based registration method, Ruizhe Wang, Jongmoo Choi, and Gérard Medioni, "3d modeling from wide baseline range scans using contour coherence," In Computer Vision and Pattern Recognition (CVPR), 2014 IEEE Conference on. IEEE, 2014, which may iteratively minimize the distance between the closest points on the predicted and observed contours, as explained below. Ruizhe Wang, Jongmoo Choi, and Gérard Medioni, "3d modeling from wide baseline range scans using contour coherence," In Computer Vision and Pattern Recognition (CVPR), 2014 IEEE Conference on. IEEE, 2014, provides more details about using contour coherence for multi-view registration of range scans. Their method is summarized below and given a brief introduction.

At a final stage, the 4 aligned key poses may be processed to generate a water-tight mesh model using the Poisson Surface Reconstruction algorithm, Michael Kazhdan, Matthew Bolitho, and Hugues Hoppe, "Poisson surface reconstruction," In Proceedings of the fourth Eurographics symposium on Geometry processing, 2006. The corresponding texture information of the 4 super-resolution range scans may be inferred using the Poisson Texture Blending algorithm, Ming Chuang, Linjie Luo, Benedict J Brown, Szymon Rusinkiewicz, and Michael Kazhdan, "Estimating the laplace-beltrami operator by restricting 3d functions," In Computer Graphics Forum, volume 28, pages 1475-1484. Wiley Online Library, 2009, as discussed more below.

Super-Resolution Range Scan

Given the field of view of the Kinect sensor, the subject may stand 2 meters away in order to cover the full body while turning in front of the device. The data may be heavily quantized at that distance. See FIG. 5B. This may therefore produce a poor quality scan, which may result in a coarse model after integration. Instead, the subject may be asked to come closer and stay as rigid as possible at the 4 key poses, while the Kinect device scans up and down to generate a super-resolution range scan. Each pose may take about 10 seconds and approximately 200 frames may be merged using the KinectFusion algorithm, Richard A Newcombe, Andrew J Davison, Shahram Izadi, Pushmeet Kohli, Otmar Hilliges, Jamie Shotton, David Molyneaux, Steve Hodges, David Kim, and Andrew Fitzgibbon, "Kinectfusion: Real-time dense surface mapping and tracking," In Mixed and augmented reality (ISMAR), 2011 10th IEEE international symposium on, pages 127-136. IEEE, 2011. See FIG. 5A.

Figure 5A:
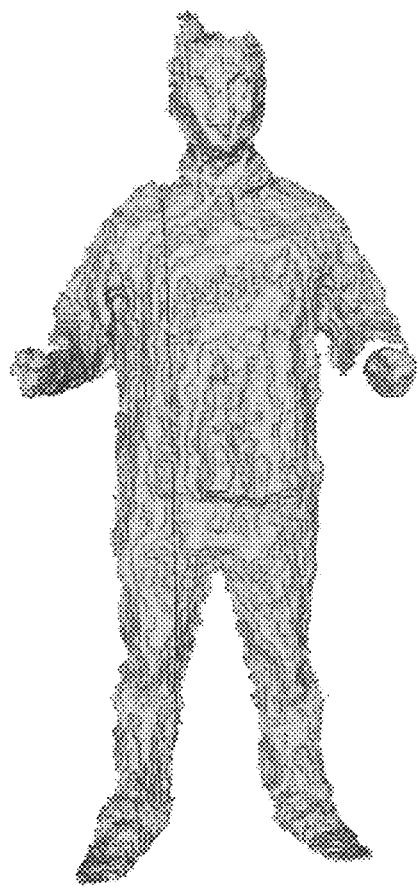
FIG. 5A illustrates an example of super-resolution range scans after integrating approximately 200 frames using a KinectFusion algorithm.
Figure 5B:
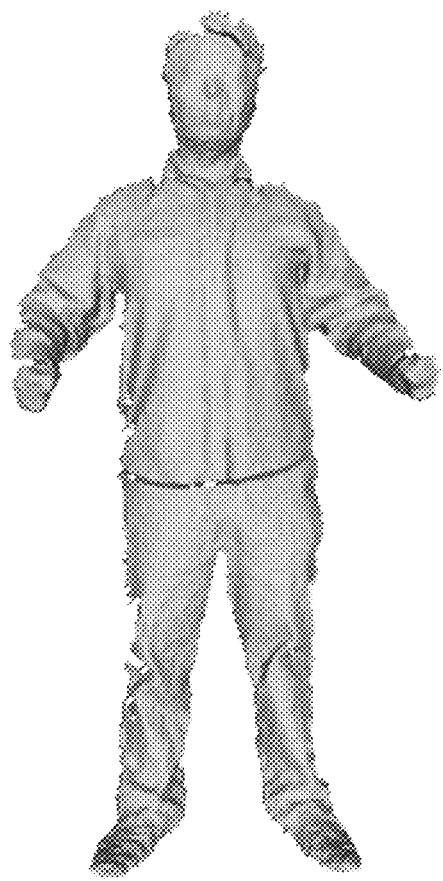
FIG. 5B illustrates an example of a low-resolution single range scan at a distance of 2 meters.

This process may greatly improve the quality of the input and may enable more details to be captured, such as wrinkles of clothes and face, as shown in FIGS. 5A and 5B. The ground may be removed by using the RANSAC algorithm, Martin A Fischler and Robert C Bolles, "Random sample consensus: a paradigm for model fitting with applications to image analysis and automated cartography," Communications of the ACM, 24(6):381-395, 1981, assuming that the subject of interest is the only thing in the sensor's predefined capture range.

Contour Coherence as a Clue

The amount of overlap between two consecutive super-resolution range scans may be limited as they are 90° apart (i.e. wide baseline). As such, traditional shape coherence based methods (e.g., ICP and its variants, Szymon Rusinkiewicz and Marc Levoy, "Efficient variants of the icp algorithm," In 3-D Digital Imaging and Modeling, 2001. Proceedings. Third International Conference on, pages 145-152. IEEE, 2001) may fail, as it may be hard to establish the point-to-point correspondences on two surfaces with small overlap.

Figure 6A:
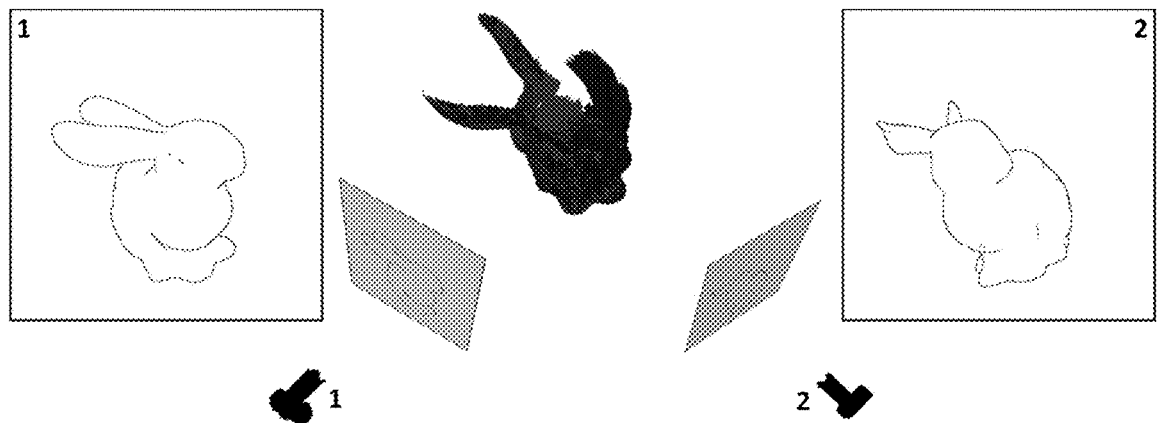
FIG. 6A illustrates an example of two roughly aligned wide baseline 2.5D range scans of the Stanford Bunny with observed and predicted apparent contours extracted. A two meshed points cloud may be generated from the two 2.5D range scans, respectively.

An example of two wide baseline range scans of the Stanford bunny with approximately 35% overlap is given in FIG. 6A. Traditional methods may fail, as most closest-distance correspondences may be incorrect.

While the traditional notion of shape coherence may fail, the concept of contour coherence for wide baseline range scan registration may be used. Contour coherence may be defined as the agreement between the observed apparent contour and the predicted apparent contour.

As shown in FIG. 6A, the observed contours extracted from the original 2.5D range scans may not match the corresponding predicted contours extracted from the projected 2.5D range scans. Contour coherence may be maximized by iteratively finding closest correspondences among apparent contours and minimizing their distances.

Figure 6B:
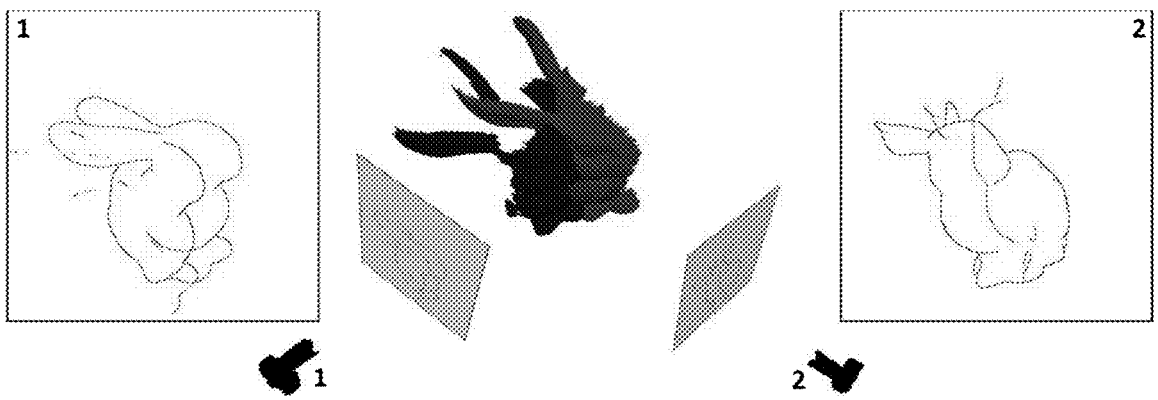
FIG. 6B illustrates an example of a registration result after maximizing contour coherence.

The registration result is shown in FIG. 6B with the contour coherence maximized and two wide baseline range scans well aligned. The contour coherence may be robust in the presence of wide baseline in the sense that, no matter the amount of overlap between two range scans, only the shape area close to the predicted contour generator may be considered when building correspondences on the contour, thus avoiding the search for correspondences over the entire shape.

Contour Coherence Based Registration Method

Contour coherence may be used to solve the registration problem of 4 super-resolution range scans with small articulations. For simplicity, the discussion may begin with the contour-based rigid registration of 2 range scans. As shown in FIG. 6A, the observed contour and the predicted contour may not match. In order to maximize the contour coherence, the closest pairs of points on two contours may be iteratively found and their distances may be minimized. Assume point $u \in R^2$ is on predicted contour in image 1 of FIG. 6A and point $v \in R^2$ is its corresponding closest point on the observed contour in image 1, their distance may be minimized as:

$$\|v - P_1(T_1^{-1} T_2 V_2(\tilde{u}))\|. \quad (1)$$

where $\tilde{u}$ is the corresponding pixel location in image 2 of u, $V_2$ maps the pixel location $\tilde{u}$ to its 3D location in the coordinate system of camera 2, $T_1$ and $T_2$ are the camera to world transformation matrices of camera 1 and 2 respectively, and $P_1$ is the projection matrix of camera 1.

Assuming known $P_1$ and $P_2$, one may iterate between finding all closest contour points on image 1 and 2 and minimizing the sum of their distances (Eq. 1) to update the camera poses $T_1$ and $T_2$ until convergence. Quaternion may be used to represent the rotation part of T. The Levenberg-Marquardt algorithm may be used to solve for the minimization as it is non-linear in parameters.

Minimizing Eq. 1 may update $T_1$ and $T_2$ at the same time. This may multi-view rigid registration to be performed in the case of 3 or more frames.

The extension from rigid registration to piecewise rigid registration may be quite straightforward. Each segment (i.e., segmented body part) may be considered rigid, and all the rigid segments may be linked by a hierarchical tree structure in the case of body modeling. The closest pairs on contours between all corresponding body segments may be iteratively found and the sum of their distances may be minimized.

Figure 8C:
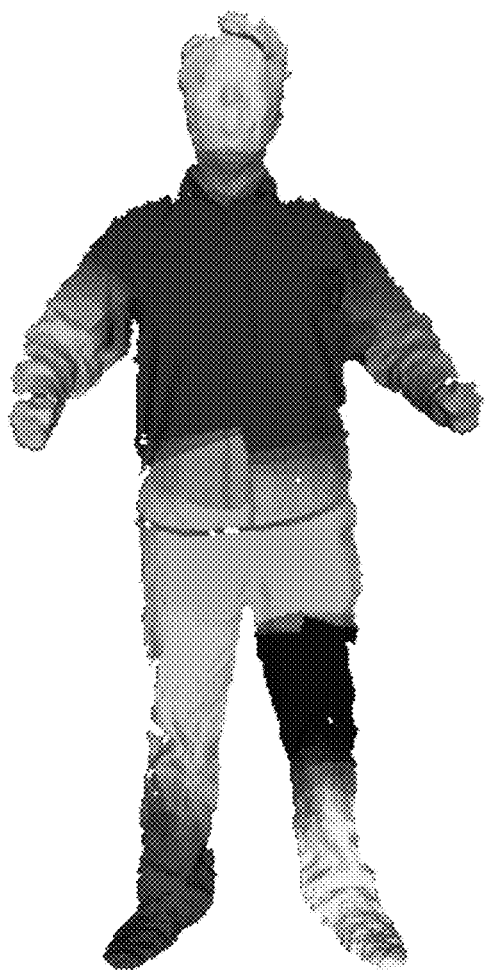
FIG. 8C illustrates an example of rough segmentation of the front pose.
Figure 8D:
FIG. 8D illustrates an example of 4 super-resolution range scans after multi-view piecewise rigid registration.

An example of a complete pipeline of the registration method is given in FIG. 7. First, the 4 super-resolution range scans may be initialized by assuming a 90° rotation between consecutive frames (FIG. 8A). Second, they may be further aligned by the multi-view rigid registration method considering the whole body as rigid (FIG. 8B). While the translation part of the camera pose may not be well estimated by the initialization procedure, it may be corrected by the multi-view rigid registration step. However, the small articulations between frames may still remain unresolved under the rigid assumption. Third, the front pose may be roughly segmented into 9 body parts in a heuristic way (FIG. 8C). Fourth, the segmentation may be iteratively processed to other frames, the closest pairs on contours between corresponding rigid body parts may be find, and their distances may be minimized to update the camera poses, as well as the human poses of each frame (FIG. 8D).

Water-Tight Mesh Model with Texture

At this point, all four super scans have been aligned to produce a point cloud with normal vectors. Poisson mesh reconstruction, Michael Kazhdan, Matthew Bolitho, and Hugues Hoppe, "*Poisson surface reconstruction,*" In Proceedings of the fourth Eurographics symposium on Geometry processing, 2006, may be used to obtain a watertight mesh from the point clouds. The Kinect camera may also capture the color information from the scanned person when generating the superscans at each pose. For each superscan, a color image corresponding to the range scan may also be stored and the color images may be combined to produce the texture for the watertight mesh.

A similar procedure as in Hao Li, Etienne Vouga, Anton Gudym, Linjie Luo, Jonathan T. Barron, and Gleb Gusev, "*3d self-portraits,*" ACM Transactions on Graphics (Proceedings SIGGRAPH Asia 2013), 32(6), November 2013, may be followed to corrode the color images and remove unreliable pixels. The corroded color images may then be transferred onto the superscans as vertex colors to produce color meshes before going through the registration process. These aligned color meshes may then be used to texture the watertight mesh generated from Poisson reconstruction.

The Poisson texture blending algorithm in Ming Chuang, Linjie Luo, Benedict J Brown, Szymon Rusinkiewicz, and Michael Kazhdan, "*Estimating the laplace-beltrami operator by restricting 3d functions,*" In Computer Graphics Forum, volume 28, pages 1475-1484. Wiley Online Library, 2009, may be applied to filling out the gaps and holes in the texture and to produce the final color mesh.

Resolution Independent Automatic Rigging

The method may automatically build and adapt a skeleton to the 3D scanned character. Thus, it can later apply the rich sets of behavior on the character through motion retargeting.

The auto-rigging method in this process may be similar to the one proposed in, Ilya Baran and Jovan Popović, "*Automatic rigging and animation of 3d characters,*" ACM Trans. Graph., 26(3), July 2007. The method may build a distance field from the mesh and uses the approximate medial surface to extract the skeletal graph. The extracted skeleton may then be matched and refined based on the template skeleton.

The method may be automatic and mostly robust, but may require a watertight and single component mesh to work correctly. This may pose a big restriction on the type of 3D models the method can be applied to. For example, the production meshes may come with many props and thus have multiple components. On the other hand, the mesh produced from range scans tend to contain holes, non-manifold geometry, or other topological artifacts that may require additional clean-up. Moreover, the resulting mesh produced through the super resolution scans may consists of hundreds of thousands of vertices. Such high resolution meshes may cause the auto-rigging method to fail during the optimization process to build the skeleton.

To alleviate this limit, a modified method may be used that works both for generic production models and large meshes.

The mesh could be approximated by a set of voxels and the distance field could be computed using the voxels. The voxels may be naturally free from any topological artifacts and may be easy to process. It may be done by first converting the mesh into voxels using depth buffer carving in all positive and negative x,y, and z directions. This may result in 6 depth images that can be used to generate the voxelization of the original mesh.

Although most small holes in the original mesh may be removed in the resulting voxels due to discretization, some holes could still remain after the voxelization. To removing the remaining holes, the image hole filling operation may be performed in the depth images to fill up the small empty pixels. After voxelization, the largest connected component may be selected and used as the voxel representation for the mesh. The resulting voxels may be watertight and connected and can be converted into distance field to construct the skeleton.

FIG. 4 is an example of the process of converting the original mesh into voxel representation to produce the skeleton hierarchy and skinning weights. The voxel representation may only be an approximation of the original mesh. Therefore the resulting distance field and consequently the skeleton could be different from the one generated with the original mesh.

Figure 9A:
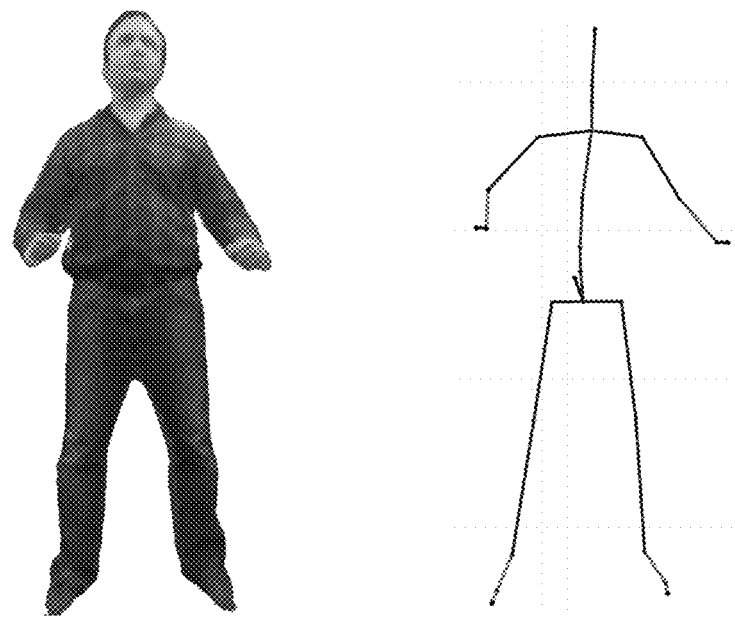
FIGS. 9A and 9B illustrates an example of voxelization that produces a skeleton similar to one extracted from original mesh.
Figure 9B:
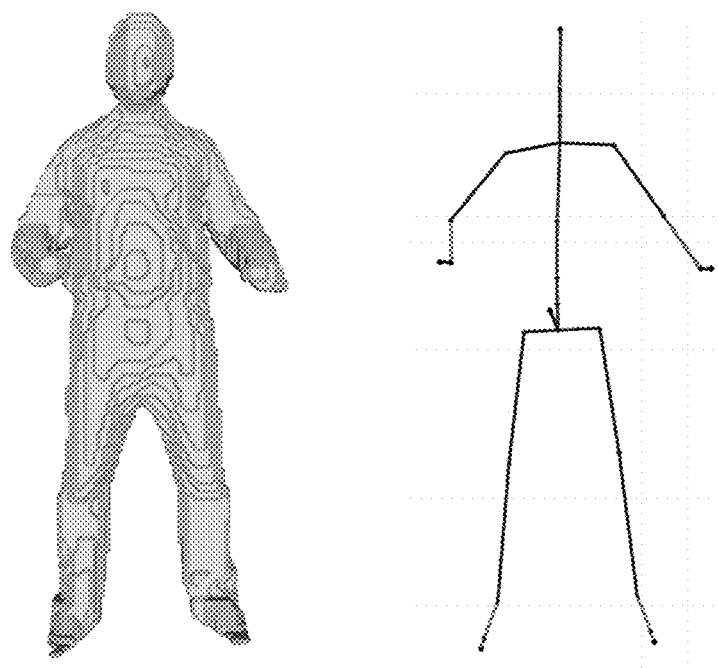

In experiments, the resulting skeletons tend to be very similar as shown in FIGS. 9A and 9B may not impact the overall animation quality in the retargeting stage. Once the skeleton is obtained, the skinning weights can be computed using the original mesh instead of the voxels, since the weight computation in, Ilya Baran and Jovan Popović, "*Automatic rigging and animation of 3d characters,*" ACM Trans. Graph., 26(3), July 2007, does not rely on the distance field. Alternatively, the skinning weights can be computed using the techniques in Olivier Dionne and Martin de Lasa, "*Geodesic voxel binding for production character meshes,*" In Proceedings of the 12th ACM SIGGRAPH/Eurographics Symposium on Computer Animation, SCA '13, pages 173-180, New York, N.Y., USA, 2013. ACM, which uses voxels to approximate the geodesic distance for computing bone influence weights. Thus, their algorithm can be applied naturally using the resulting voxels and skeleton to produce higher quality smooth bindings.

1.5 Behavior Transfer

The behavior transfer stage may work by retargeting an example motion set from our canonical skeleton to the custom skeleton generated from automatic rigging. Here the method from Andrew Feng, Yazhou Huang, Yuyu Xu, and Ari Shapiro, "*Fast, automatic character animation pipe-* lines," Computer Animation and Virtual Worlds, pages n/a-n/a, 2013, may be used to perform motion retargeting.

The retargeting process can be separated into two stages. The first stage may be to convert the joint angles encoded in a motion from the canonical skeleton to the custom skeleton. This may be done by first recursively rotating each bone segment in a target skeleton to match the global direction of that segment in a source skeleton at a default pose so that the target skeleton is adjusted to have the same default pose as the source skeleton. Once the default pose is matched, the discrepancy between their local frames may be addressed by adding suitable pre-rotation and post-rotation at each joint in target skeleton. These pre-rotation and post-rotation may then be used to convert the joint angles from the source canonical skeleton to the target skeleton.

The second stage may use inverse kinematics to enforce various positional constraints, such as foot positions to remove motion artifacts such as foot sliding. The inverse kinematic method may be based on damped Jacobian pseudo-inverse, Samuel R. Buss, "*Introduction to inverse kinematics with jacobian transpose, pseudoinverse and damped least squares methods*," Technical report, IEEE Journal of Robotics and Automation, 2004. This IK method may be applied at each motion frame in the locomotion sequences to ensure the foot joint is in the same position during the foot plant stage. After the retargeting stage, the acquired 3D skinned character can be incorporated into the animation simulation system to execute a wide range of common human-like behaviors such as walking, gesturing, etc.

Applications

3D Capture for Use in Games and Simulation

Figure 10:
FIG. 10 illustrates an example of a captured character from scan containing 306 k vertices and 613 k faces. Distinguishing characteristics may be preserved in the capture and simulation, such as hair color, clothing style, height, and skin tone.
Figure 11:
FIG. 11 illustrates examples of models generated from captures over a period of 4 days that include changes and commonality in clothing, hair styles, and other elements of appearance.
Figure 11:

This method of capture and processing, registration and subsequent simulation of a human figure is illustrated in FIG. 10. The construction of a 3D model may take approximately 4 minutes, and the automatic rigging, skinning and registration of a deformable skeleton may take approximately 90 seconds. Models may typically contain between 200 k and 400 k vertices, and 400 k to 800 k faces. Simulation and control of the character may be performed in real time using various animations and procedurally-based controllers for gazing and head movement. The 3D models captured in this way may be suitable for use in games where characters need to be recognizable from a distance, but do not require face-to-face or close interactions.

Temporal Avatar Capture

Since the method may enable the capture of a 3D character without expert assistance and uses commodity hardware, it may be economically feasible to perform 3D captures of the same subject over a protracted period of time. For example, a 3D model could be taken every day of the same subject, which would reflect their differences in appearance over time. Such captures may reflect changes in appearance, such as hair style or hair color, clothing, or accessories worn. In addition, such temporal captures could reflect personal changes, such as growth of facial hair, scars, and weight changes. Such temporal information could be analyzed to determine clothing preferences or variations in appearance.

The method may generate a skeleton for each 3D model. Thus avatars of the same subject may share the same topology, but may have differing bone lengths.

Crowds

Many applications that use virtual crowds may require tens, hundreds or thousands of characters to populate the virtual space. Research has experimented with saliency to show the needed variation in traditionally modeled characters to model a crowd, Rachel McDonnell, Micheál Larkin, Benjamin Hernández, Isaac Rudomin, and Carol O'Sullivan, "*Eye-catching crowds: Saliency based selective variation*," ACM Trans. Graph., 28(3):55:1-55:10, July 2009, as well as the number of variations needed, Rachel McDonnell, Micheál Larkin, Simon Dobbyn, Steven Collins, and Carol O'Sullivan, "Clone attack! perception of crowd variety," ACM Trans. Graph., 27(3):26:1-26:8, August 2008. By reducing the cost of constructions of 3D characters, crowd members can be generated from a population of capture subjects, rather than through traditional 3D means.

Detailed Body Imagery

Figure 2:
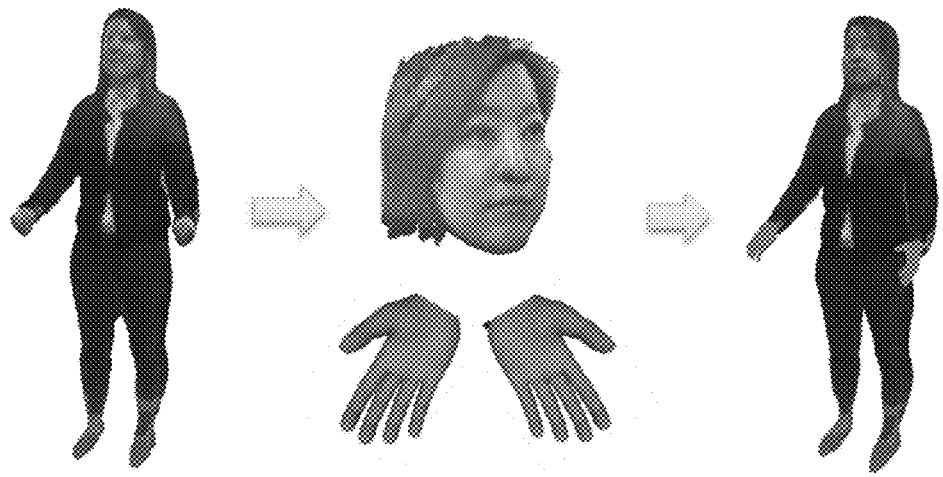
FIG. 2 illustrates an example of an overall work flow of using face and hands captured at closer distance to replace a portion of a captured avatar.

By adjusting the distance of the sensor to the human subject, greater resolution can be obtained when capturing a smaller area of the body. For example, a high resolution face can be obtained using the same sensor that captures the entire body by focusing only on the face. This high resolution image can, in turn, be reintegrated into the original body scan model, produces an new model that contains higher detail images. See FIG. 2.

Model Generation from Different States

Figure 3:
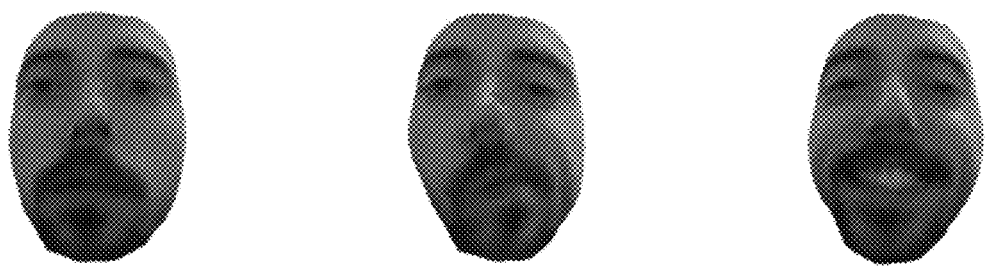
FIG. 3 illustrates an example of scanning faces of a person with different facial expressions.

Additional models can be generated by training the sensor on a body part when it is in a different state or exhibiting a different behavior. An example, when a face is performing a particular emotional expression. See FIG. 3. This allows for the construction of a model that represents a state different from the original pose. Another example would be to show a hand in an open, closed, or pointing configuration.

Unless otherwise indicated, the various data processing operations that have been described may be implemented with a computer system configured to perform these data operations. The computer system may include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include one or more computers at the same or different locations. When at different locations, the computers may be configured to communicate with one another through a wired and/or wireless network communication system.

The computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by the computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative.

None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A computer-implemented method for generating a virtual character, comprising:
    capturing a plurality of super-resolution range scans of an individual, each of the plurality of super-resolution range scans being a different profile of the individual with limited overlap;
    generating 3D data including a mesh representative of a three dimensional shape and appearance of a portion of the individual based on the plurality of super-resolution range scans of the individual, the 3D data generated using contour-based registration of the plurality of super-resolution range scans of the individual using multi-view rigid registration, heuristically segmenting a first scan into a plurality of body parts, iteratively segmenting other scans, finding closest pairs on contours between adjacent body parts from the plurality of body parts, and minimizing distances to update the plurality of super-resolution range scans of the individual;
    generating a skeleton based on the mesh representative of the three dimensional shape and appearance of the portion of the individual;
    automatically rigging the skeleton within the mesh representative of the three dimensional shape and appearance of the portion of the individual, the automatic rigging including building a distance field from the mesh representative of the three dimensional shape and appearance of the portion of the individual, using an approximate medial surface to extract a skeletal graph, and matching and refining the skeletal graph based on a template skeleton;
    transferring behavior by automatically retargeting an example motion set from a source skeleton to the rigged skeleton; and
    generating the virtual character that is animated and controlled based on the rigged skeleton.

2. The method of claim 1, further comprising mapping each of multiple behavior commands to one or more of a library of virtual character movement instructions.

3. The method of claim 1, further comprising:
    causing one or more sensors to capture a movement of the individual; and
    transforming the movement of the individual into virtual character movement instructions.

4. The method of claim 3, further comprising mapping each of multiple behavior commands to one or more of a library of virtual character movement instructions that mimic an individual movement style of the individual.

5. The method of claim 1, further comprising:
    directing the individual to pose in four different positions; and
    generating the 3D data of the individual in each of the four different positions.

6. The method of claim 5, further comprising:
    directing the individual to rotate a total of about 360 degrees in about 90 degree increments, wherein the plurality of super-resolution range scans of the individual are captured in the about 90 degree increments during the rotation.

7. The method of claim 1, further comprising:
    generating skinning weights based on the mesh representative of the three dimensional shape and appearance of the portion of the individual.

8. The method of claim 1, wherein generating the virtual character that is animated and controlled is further based on the skinning weights.

9. The method of claim 1, wherein generating the 3D data including the mesh representative of the three dimensional shape and appearance of the portion of the individual includes generating multiple sets of 3D data of the portion of the individual, each set of the multiple sets of 3D data corresponding to a scan taken from a different physical distance from the individual.

10. The method of claim 9, wherein generating the 3D data includes replacing a set of the 3D data corresponding to a scan taken at a farther distance with a different set of the 3D data corresponding to a scan taken at a closer distance.

11. The method of claim 10, wherein the individual has a face and the portion of the individual that is replaced is of the face.

12. The method of claim 10, wherein the individual has a hand and the portion of the individual that is replaced is of the hand.

13. The method of claim 1, wherein capturing the plurality of super-resolution range scans of the individual includes scanning the individual at the different profile, wherein each of the plurality of super-resolution range scans merges approximately 200 frames and takes approximately 10 seconds, wherein each consecutive super-resolution range scan of the plurality of super-resolution range scans has a 90 degree difference in the profile.

14. The method of claim 1, wherein the automatic rigging includes approximating the mesh representative of the three dimensional shape and appearance of the portion of the individual using a set of voxels and calculating a distance field using the set of voxels, the mesh representative of the three dimensional shape and appearance of the portion of the individual being converted into voxels using depth buffer carving in all positive and negative X, Y, and Z directions.

15. The method of claim 14, wherein the retargeting includes converting joint angles encoded in a motion from the source skeleton to the rigged skeleton by recursively rotating each bone segment in the rigged skeleton to match a global direction of the respective bone segment in the source skeleton at a default pose to adjust the rigged skeleton to have the default pose of the source skeleton, and adding pre-rotation and post-rotation at each joint in the rigged skeleton to remove discrepancies.

16. A system, comprising:
a memory configured to store instructions that generate a virtual character; and
a processor coupled to the memory and configured to execute instructions stored in the memory and perform operations comprising:
capturing a plurality of super-resolution range scans of an individual, each of the plurality of super-resolution range scans being a different profile of the individual with limited overlap;
generating 3D data including a mesh representative of a three dimensional shape and appearance of a portion of the individual based on the plurality of super-resolution range scans of the individual using multi-view rigid registration, heuristically segmenting a first scan into a plurality of body parts, iteratively segmenting other scans, finding closest pairs on contours between adjacent body parts from the plurality of body parts, and minimizing distances to update the plurality of super-resolution range scans of the individual;
generating a skeleton and skinning weights based on the mesh representative of the three dimensional shape and appearance of the portion of the individual;
automatically rigging the skeleton within the mesh representative of the three dimensional shape and appearance of the portion of the individual, the automatic rigging including building a distance field from the mesh representative of the three dimensional shape and appearance of the portion of the individual, using an approximate medial surface to extract a skeletal graph, and matching and refining the skeletal graph based on a template skeleton;
transferring behavior by automatically retargeting an example motion set from a source skeleton to the rigged skeleton; and
generating the virtual character that is animated and controlled based on the rigged skeleton and skinning weights.

17. The system of claim 16, further comprising:
one or more sensors including a single depth sensing camera and a single color camera, wherein capturing the plurality of super-resolution range scans of the individual includes using the one or more sensors.

18. The system of claim 16, wherein the processor is further configured to perform operations comprising mapping each of multiple behavior commands to one or more of a library of virtual character movement instructions.

19. The system of claim 16, wherein the processor is further configured to perform operations comprising:
causing one or more sensors to capture a movement of the individual; and
transforming the movement of the individual into virtual character movement instructions.

20. The system of claim 19, wherein the processor is further configured to perform operations comprising mapping each of multiple behavior commands to one or more of a library of virtual character movement instructions that mimic an individual movement style of the individual.

21. The system of claim 16, wherein the processor is further configured to perform operations comprising:
directing the individual to pose in four different positions; and
generating the 3D data of the individual in each of the four different positions.

22. The system of claim 21, wherein the processor is further configured to perform operations comprising directing the individual to rotate a total of about 360 degrees in about 90 degree increments, wherein the plurality of super-resolution range scans of the individual are captured at in the about 90 degree increments during the rotation.

* * * * *